United States Patent [19]

Fabre

[11] 4,265,917

[45] May 5, 1981

[54] BINDER COMPOSITIONS FOR TEXTURIZED PROTEINS AND THEIR USE IN THE PREPARATION OF FOODSTUFF

[75] Inventor: Albert Fabre, Venissieux, France

[73] Assignee: Rhone-Poulenc Industries, Paris, France

[21] Appl. No.: 901,828

[22] Filed: May 1, 1978

[30] Foreign Application Priority Data

May 4, 1977 [FR] France .................. 77 14310

[51] Int. Cl.³ .............................. A23J 3/00
[52] U.S. Cl. .................. 426/104; 426/274; 426/285; 426/302; 426/453; 426/520; 426/523; 426/580; 426/583; 426/656; 426/657; 426/802
[58] Field of Search ............... 426/104, 285, 302, 580, 426/656, 657, 453, 465, 520, 523, 802, 274, 583; 260/112 G, 121

[56] References Cited

U.S. PATENT DOCUMENTS

| | | | |
|---|---|---|---|
| 2,730,447 | 1/1956 | Boyer | 426/656 X |
| 2,730,448 | 1/1956 | Boyer et al. | 426/656 X |
| 2,785,069 | 3/1957 | Dudman | 426/802 X |
| 3,343,963 | 9/1967 | Kjelson | 426/802 X |
| 4,001,441 | 1/1977 | Liepa | 426/802 X |
| 4,107,334 | 8/1978 | Jolly | 426/657 X |
| 4,125,630 | 11/1978 | Orthoefer | 426/802 X |

FOREIGN PATENT DOCUMENTS

754215 12/1970 Belgium ................. 426/656
1048464 9/1951 France .

*Primary Examiner*—Arthur L. Corbin
*Attorney, Agent, or Firm*—Burns, Doane, Swecker & Mathis

[57] ABSTRACT

A foodstuff composed of a texturized protein impregnated with a binder composition comprising gluten, dairy seroproteins, albumin and an edible liquid diluent, e.g. water.

28 Claims, No Drawings

BINDER COMPOSITIONS FOR TEXTURIZED PROTEINS AND THEIR USE IN THE PREPARATION OF FOODSTUFF

BACKGROUND OF THE INVENTION

1. Field of the Invention

The present invention relates to high quality foodstuff compositions capable of imparting good cohesion and additional nutrient values to protein substances, to the products similar to meat which contain such compositions, as well as to the process for obtaining the said products simulating meat, including meat substitutes.

2. Description of the Prior Art

Meat substitutes are prepared in accordance with any one of a number of different texturizing methods from vegetable or animal proteins, such as those extracted from, for example, soya beans, sunflower seeds, horsebeans, peas, peanuts or milk casein. The methods most commonly used for converting crude proteins into more elaborate products useful as meat substitutes are extrusion and spinning.

By "spinning" there is intended a process for forming threads by extruding a solution, a dispersion or a gel through a plate provided with small diameter orifices, or spinneret, of appropriate shape and size. The products obtained according to the spinning process are referred to as threads, filaments and/or fibers, and a combination of such filaments is referred to as a bundle. Spinning offers the advantage that it reproduces the fibrous nature of the meats and makes it possible to obtain a variety of products in respect of their appearance and their nutrient properties. However, it necessitates the use of purified proteins, such as isolated protein products, which typically are powders containing more than 90% of proteins. In fact, products containing less than 70% of proteins cannot be directly spun.

In order to be spun, the proteins must first be converted into a protein gel; in the present text, the term "protein gel" or "collodion" will denote a dispersion of isolated protein products in an appropriate dispersing medium, such as an alkaline solution; the said dispersion can reach the point of forming a colloidal solution, depending on the type of proteins dispersed and on the dispersing agent employed.

The filaments obtained by spinning are coagulated in an acid and/or saline bath and are then drawn, neutralized and washed. Such technique provides bundles of filaments of different thicknesses, depending on the number and diameter of the holes of the spinneret. Coagulation fixes or sets the structure of the filaments and drawing, by orienting the filaments, makes it possible to vary their softness or their hardness. However, in order that the proteins thus molded or shaped simulate meat as closely as possible (the term meat, within the scope of the invention, encompasses both mammalian flesh and the flesh of birds, fish, crustaceans and other animals which man consumes for his nourishment), it is essential to have, in addition to the fibrous character, a certain texture and consistency which provides the sensation, which is difficult to reproduce, of "chewing" in the course of the ingestion of the product, as well as providing all the flavor of animal flesh. It thus proves necessary to impart to the proteins the cohesiveness and texture of the natural products sought to be reproduced.

It has also been proposed to bond the protein fibers to one another by means of ovalbumin (or egg albumin) used either by itself or mixed with other compounds.

Ovalbumin, used as the sole binder, has successfully fulfilled its function, but for certain preparations which require heating and rehydration it has not proved entirely satisfactory because the product obtained has a floury and looser appearance than a natural meat.

Furthermore, it is a relatively expensive product while one of the objects of the preparation of meat substitutes is, precisely, to obtain inexpensive proteinaceous materials.

Ovalbumin has been introduced into binder compositions containing other ingredients. Thus, it has been proposed to impregnate the protein fibers with a ternary composition consisting of albumin, gluten and defatted oleaginous seeds (cf. U.S. Pat. No. 3,343,963).

Other compounds have also been mentioned as possible binders, namely, gelatin, casein, wheat flour or soya flour, and solids based on dried milk (compare French Pat. No. 1,048,464). Finally, in addition to the products above mentioned, the starches, the alginates and the pectins can also be used as binders.

Some of these compositions suitably fulfill their function as a binder for protein fibers, but neither the texture of the final product obtained nor, above all, the nutrient properties of the binder, are optimized.

Accordingly, a great need exists for a meat substitute, based on proteins, in particular on vegetable proteins, which exhibits nutrient properties and a protein balance equivalent to or even superior to those of animal meat.

SUMMARY OF THE INVENTION

Accordingly, a primary object of the present invention is to provide novel binder compositions for texturized proteins, characterized in that same are comprised of at least gluten, dairy seroproteins and albumin, optionally together with a consumable liquid, i.e., an edible (potable) liquid diluent.

One advantage of the binder compositions according to the invention resides in the purity of the components used; these components are commercially available in sufficiently high purity and sufficiently uniform quality that, as a corollary thereto, it is possible to obtain resultant compositions of corresponding quality.

One of the advantages of the use of the binder composition according to the invention for binding spun proteins to one another resides in the pleasant texture obtained. The consistency and cohesion of the products thus obtained are remarkably similar to those natural products of animal origin.

Another advantage is the possibility of optimally balancing, by virtue of the binder composition employed, the aminoacids in the final product, by correcting certain deficiencies of some of the aminoacids, especially those sulfur-containing aminoacids, in proteins of vegetable origin, such as, for example, protein from soya, sunflowers or horsebeans. Foodstuff products of high nutritive value are obtained, which have a protein efficiency coefficient of the same order of magnitude as that of the milk casein which serves as a reference. It will be recalled that the protein efficiency coefficient (or P.E.C.) is the ratio of the gain in weight to the amount of proteins consumed in the diet, for a given period, compared to a casein diet (*Fd. Prod. Developt.*, April 1973 - 62, p. 57). It can thus be stated that in addition to its purely mechanical properties as a binder, resulting from the presence of the albumin and the gluten, the binder composition according to the invention greatly improves the nutritive properties and protein balance of the fibers with which it is combined, by virtue of the seroproteins of the binder and, to a lesser degree, of the gluten.

DETAILED DESCRIPTION OF THE INVENTION

The gluten used in the binder composition is preferably wheat gluten because this is the commercially available product and it is low in cost. It is obviously possible to use rye gluten, or gluten from any other cereal, provided it has the same aminoacid constitution as wheat gluten. Regardless of the form of gluten employed, it is particularly valuable to use "vitalized" gluten, which has neither been modified nor denatured by prolonged heating or by an alkaline treatment. It is desirable to use freshly prepared gluten, but it is possible to employ the gluten in its dehydrated form, which is preferably reconstituted by adding thereto an amount of water of form 50 to 75% by weight.

The dairy seroproteins employed can be obtained in known manner by ultrafiltration of milk, or by thermal coagulation.

The albumin preferably originates from fresh eggs or from dried eggwhite, but it is possible to envisage other sources, such as milk, fish, elastin and keratin.

By a "consumable liquid" there essentially is intended milk or water, and preferably the latter. If one or more constituents of the binder composition is or are in the liquid state, the amount of consumable liquid to be added can be reduced, or the liquid can even be omitted.

The proportions of the various constituents of the binder composition according to the invention can vary over wide limits depending on the texture of the animal flesh sought to be imitated and depending on the desired balance of the various aminoacids in the final product. The percentage of gluten, calculated as dry material, relative to the total weight of the binder composition can, for example, vary from 10 to 20% by weight, and is preferably between 13% and 17%. The dairy seroproteins can represent, as dry material, from 10 to 20% by weight of the total binder composition, and preferably from 13 to 17%. The albumin, again calculated as dry material, can be present to the extent of 1 to 5% by weight in the binder composition, and preferably 1.5 to 3%. The consumable liquid is used in sufficient amount to make up the binder composition to 100% by weight.

A composition which is very particularly suitable for agglomerating proteins, preferably spun proteins, consists of vitalized gluten, dairy seroproteins, ovalbumin and water.

Another object of the invention is the use of the said binder composition for the preparation of meat substitutes consisting of protein fibers bonded to one another in a stable and structured manner. The said meat substitutes are characterized in that they consist of spun proteins of vegetable and/or animal origin, and of the binder composition as defined above. Preferably, spun proteins consisting of filaments having a diameter of 10 to 300 microns and possessing, in their cross-section, particles of fatty matter having a diameter of 1 to 60 microns, and a degree of saponification of less than 5%, are used; this means that there are not more than 5% of ester groups of the fatty matter employed which can be saponified at the time of contact with the alkaline protein gel.

The spun proteins employed within the scope of the invention can be any protein filaments obtained in accordance with known spinning processes, such as, for example, those described in French Pat. No. 1,048,464 and in U.S. Pat. Nos. 2,730,447 and 2,730,448, hereby incorporated by reference. Thus, a large variety of proteins can be employed, in particular isolated vegetable proteins, such as those from soya, sunflowers, horsebeans, peas, peanuts, maize, rapeseed, alfalfa, oats, barley and wheat, or animal proteins such as lactoproteins (casein, caseinate and seroproteins), gelatin, blood proteins and fishmeal. The proteins isolated from soya, sunflower, horsebeans and milk casein are the preferred starting materials.

The protein is dispersed in an alkaline medium. The protein concentration of the aqueous suspension can vary over wide limits, from 5 to 40% by weight, but preferably between 10 and 25% by weight. The alkaline solution used to prepare the protein gel can advantageously be an aqueous sodium hydroxide and/or potassium hydroxide solution of such concentration that the weight ratio of base/protein is from 2 to 25%. The pH of the mixture obtained generally varies between 9 and 13.5. The protein gel is prepared at a temperature varying from 2° to 25° C., and preferably from 2° to 7° C., in a homogenizer charged with the aqueous suspension and the alkaline solution, these preferably being contained in separate reservoirs.

The gel obtained is then extruded through one or more spinnerets. The spinnerets employed are usually of the type as those employed for spinning artificial or synthetic textile fibers. They are characterized by the number of orifices (generally from 2,000 to 15,000 orifices) and by their diameters (from 0.05 mm to 0.30 mm).

The filaments obtained are collected in a coagulant medium in which the spinneret is immersed.

As the coagulant, it is possible to use an organic liquid, but it is preferred to use an aqueous solution of an acid such as hydrochloric acid, acetic acid, lactic acid, citric acid, sulfur dioxide, sulfuric acid, nitric acid, phosphoric acid, or other similar acids, or an aqueous solution of a salt, such as sodium chloride, calcium chloride or sodium acetate, or an aqueous solution of an acid and a salt, such as those mentioned above.

The acid concentration of the bath can vary from 0.5% to 10% by weight, but it is preferably selected to be between 2 and 5% by weight. The concentration of the salts can also vary greatly, namely, from 0.5 to 20% by weight, but is preferably between 5% and 10% by weight. One of the preferred coagulation baths is an aqueous solution containing 5% by weight of acetic acid and 5% by weight of sodium acetate.

The temperature at which the coagulation is carried out can vary over wide limits, from 5° to 80° C., but is preferably selected to be near ambient temperature, namely 20° to 25° C. The filaments are then drawn.

The bundle of filaments thus obtained is then neutralized to pH values of between 4.5 and 6.5 and preferably of about 5.5, which value corresponds to the pH region of the natural products. The choice of the composition and concentration of the neutralization bath is determined by the acidity of the coagulating bath. The neutralization bath used can be an aqueous solution of a base, such as, for example, sodium hydroxide or potassium hydroxide, an aqueous solution of a salt, such as sodium chloride, calcium chloride, sodium bicarbonate, potassium bicarbonate, sodium carbonate or potassium carbonate, or an aqueous solution of a base and a salt such as those mentioned above. The concentration of the neutralization bath can vary over wide limits and can be from 1 to 10% by weight, in the case of the basic compounds, and from 1 to 20% by weight, in the case of the neutral compounds.

A wash with water is then carried out to remove the residual inorganic salts and, where necessary, complete the neutralization. This wash can be effected by passage through a bath, by spraying on rollers or by any other suitable system. Depending on the acidity of the coagulation medium, washing alone may suffice without the neutralization stage being necessary.

The wet fibers obtained contain about 50 to 80% of water.

A preferred embodiment of the preparation of the meat substitutes consists of starting from spun proteins containing fatty matter within the said fibers, this fatty matter having been introduced before spinning.

The fatty matter incorporated into the proteins can be any edible fatty matter, used by itself or as a mixture; most commonly, the various oils such as peanut oil, olive oil, corn oil, sunflower oil, soya oil, nut oil, coconut oil, sesame seed oil, cottonseed oil, safflower oil or fish oils and/or animal or vegetable fats, such as butter, margarine, beef suet, lard or chicken fat are ued.

The said proteins which internally contain fine particles of fatty matter are prepared from a protein gel obtained as described above and fatty matter introduced by a method of incorporation which consists of feeding the fatty matter, maintained in the liquid state, and the said protein gel separately, and at the appropriate relative flow rates, into the feed or inlet circuit of the spinneret, either upstream from, or, in a mixing device, intimately mixing the two constituents by any mechanical means for a period, measured up to the time of spinning, which does not exceed 2 minutes, and spinning the mixture thus prepared. The filaments thus formed are subjected to the same coagulation, drawing, neutralizing and washing treatments as described above.

The proportion of fatty matter added to the protein gel can vary from 0.5 to 40% by weight relative to the proteins, preferably from 5 to 30% depending on the type of flesh which it is desired to imitate.

A particular embodiment of the incorporation of the fatty matter consists of feeding the protein gel and the fatty matter, in defined amounts by means of metering pumps into, for example, a gear pump, where the mixture is homogenized within a contact time which does not exceed 2 minutes.

The meat substitutes are thus obtained from protein fibers of animal and/or vegetable origin having a water content of between 50% and 80% and containing from 0 to 20% by weight of fatty matter relative to the wet fibers, and bonded to one another by means of the binder composition as described above. Preferably, the fibers contain from 60 to 70% by weight of water and from 5 to 10% by weight of fatty matter. Obviously, it is possible to employ dehydrated proteins which contain less than 10% by weight of water but it would be necessary to add much more water to the binder composition so as to restore the water content to a value within the limits defined above.

The binder is used in such amount that it yields a product having fibers bonded to one another in a structured and stable manner, in order that the product shall acquire a cohesion which withstands subsequent processing treatments, such as the various methods of cooking or of preparation. The weight ratio of the wet spun proteins to the composition can vary from 4/1 to 1/2 and is preferably about 1/1. This ratio corresponds to protein fibers containing from 60 to 70% by weight of water.

It is also possible to add to the binder composition any ingredient such as, for example, flavorings, spices, colorants, preservatives, vitamins and emulsifiers and, optionally, the fatty matter.

It is desirable to add flavorings which give the final product a good meat flavor and colorants which are accepted for foodstuff purposes and reproduce the natural color of the meat.

The binder composition can thus contain flavorings, spices and colorants in varying proportions given below. By way of representative example, it can contain from 0 to 4% by weight of flavorings, from 0 to 4% by weight of natural or artificial colorants and from 0 to 2% of spices. These ingredients are dissolved or suspended in the amount of water necessary to make up the said composition to 100% by weight.

The impregnation of the protein fibers with the binder composition can be carried out in accordance with various different embodiments.

Thus, a mixture of the spun proteins, which may or may not contain the fatty matter, and of the binder composition of the invention can be prepared in a malaxating device, such as, for example, planetary malaxators, sigma malaxators, ribbon mixers, double-paddle malaxators and Hobart mixers. The above-mentioned binder composition has the consistency of a fluid paste. In order to homogenize it well, it is preferable to introduce it first into the malaxator. The mixture of protein fibers and binder composition is malaxated for a period which can vary from 15 minutes to 1 hour but preferably from 30 minutes to 40 minutes. In general, this impregnation is carried out at ambient temperature, without same being essential. It is possible to add flavorings, colorants and spices and, optionally, an emulsifier or fatty matter, in cases where these are not yet present in the proteins, either by introducing the said additives into the binder composition or by impregnating the spun proteins separately with such ingredients; preferably, same are introduced directly into the binder composition.

The impregnated fibers are then subjected to a heat treatment by heating them to a temperature at which the binder composition coagulates. Though the exact heat coagulation temperature varies depending on the source of protein used, it has been found that in general the coagulation temperature is between 50° and 120° C. and preferably between 80° and 100° C. In general, the spun proteins impregnated with the binder composition are spread, at a certain thickness, in a mold or on a horizontal support, and are cooked, for example, by passage through an oven, for a period which can vary from 15 minutes to 1 hour. In general, once the desired temperature has been reached, a period of 15 to 20 minutes can be sufficient to achieve coagulation of the binder composition. Cooking can also be carried out by spreading the mixture obtained after malaxating on a heated horizontal support.

After this cooking, proteins bonded to one another in a stable manner are obtained. Obviously, the cake thus obtained can be cut up into small pieces of various shapes.

The process of the invention can advantageously be carried out continuously. In fact, the bundle or tow of fibers issuing from the coagulation, neutralization and washing baths can be impregnated by passing them through a bath containing the binder composition or by simply spraying same with the said composition. Obviously, other baths can be added to the sequence, especially a bath of fatty matter maintained in the liquid state, if the protein fibers do not yet contain such fatty matter.

Thereafter, the material is cooked at the identical temperature to that of the discontinuous embodiment, by passing the bundle of impregnated fibers through an oven heated by any appropriate means, such as hot air, steam, infra-red or microwaves. Since the operation is carried out continuously, cooking is rapid and takes from 30 seconds to 5 minutes.

The fibers thus bonded are packaged in accordance with any shape desired.

One of the applications of the binder compositions according to the invention is the production of foodstuff products based on vegetable proteins and/or animal proteins which have an optimized, predetermined aminoacid balance and a pleasant texture and form a structure which is sufficiently stable to withstand the various culinary uses. Depending on the flavorings, colorants, spices and fatty matter which may be incorporated, these products can have the flavor and appearance of any particular animal flesh, which may be that of mammals or that of fish, poultry or crustaceans. One thus has animal meat substitutes which exhibit all the properties of the natural products, while being less expensive than the latter, and being of constant and uniform quality, balanced in respect of the essential aminoacids, and having high nutritive value; they can furthermore be prepared under excellent conditions in respect of hygiene and sterility.

In order to further illustrate the present invention and the advantages thereof, the following specific examples are given, it being understood that the same are intended only as illustrative and in nowise limitative. Unless stated otherwise, the percentages given in the examples are expressed by weight.

EXAMPLE 1

100 grams of the following binder composition:
Drinking water: 66.6%
Vitalized gluten (wheat): 15.0%
Dairy seroproteins (obtained by ultrafiltration of milk): 15.0%
Dried eggwhite (ovalbumin): 2.2%
Natural chicken flavoring: 1.0%
Spices: 0.2%
and 100 g of soya fibers obtained by spinning and having the following characteristics:
Diameter of the fibers: from 115 to 130 microns
Water content: 70%
Proteins isolated from soya: 25.5%
Beef suet incorporated into the fibers: 4.5%
pH: 5.8 to 6.0
were successively introduced into a mixer.

The mixture was homogenized for 30 minutes at ambient temperature.

The mixture was then spread in the form of a layer about 20 mm thick and was cooked at a material temperature of 95° C. for 30 minutes.

After cutting, pieces having the following composition were obtained:
Water content: 68.2%
Protein isolated from soya: 12.8%
Beef suet: 2.3%
Vitalized gluten (wheat): 7.5%
Diary seroproteins: 7.5%
Ovalbumin (expressed as solids): 1.1%
Chicken flavoring: 0.5%
Spices: 0.1%

EXAMPLE 2

100 g of the following binder composition:
Drinking water: 64.6%
Vitalized gluten (wheat): 5%
Dairy seroproteins (isolated by thermal flocculation): 15%
Dried ovalbumin: 3%
Natural beef flavoring: 1%
Spices: 0.90%
Caramel colorant: 0.25%
and 100 g of soya fibers obtained by spinning, having the identical composition and identical characteristics as those of Example 1, were successively introduced into a mixer.

The mixture was homogenized for 30 minutes at ambient temperature. It was then spread in the form of a layer about 20 mm thick and was cooked at a material temperature of 95° C. for 30 minutes.

After cutting, pieces having the following composition were obtained:
Carbohydrates: 3.2%
Lipids: 3.2%
Proteins: 27.6%

A check of the protein efficiency coefficients of the protein isolated from soya, the spun soya fibers, the bonded pieces obtained in this Example 2 and casein gives the results summarized in the Table below:

TABLE

| Products checked | P.E.C. | Standard deviation | Corrected P.E.C. |
|---|---|---|---|
| Casein | 2.96 | 0.33 | 2.5 |
| Proteins isolated from soya | 1.61 | 0.28 | 1.36 |
| Spun soya fibers | 1.59 | 0.26 | 1.34 |
| Bonded pieces | 3.06 | 0.27 | 2.54 |

It will be noted that the subject binder composition very markedly improves the nutritive quality of the final product.

EXAMPLE 3

100 g of the following binder composition:
Drinking water: 66%
Vitalized gluten (wheat): 15%
Dairy seroproteins (isolated by thermal flocculation): 15%
Fish flavoring: 1%
Dried ovalbumin: 3%
and 100 g of spun soya fibers having the following characteristics:
Diameter of the fibers: 120 to 130 microns
Water content: 70%
Content of proteins isolated from soya: 30%
No fatty matter incorporated:
pH: 5 to 5.5
were successively introduced into a mixer.

The mixture was malaxated for 30 minutes at ambient temperature. It was then spread in a layer about 20 mm thick and cooked at a material temperature of 95° C. for 30 minutes.

After cutting, pieces having the following composition were obtained:
Water content: 68%
Vitalized gluten (wheat): 15%
Milk seroproteins: 15%
Dried ovalbumin: 1.5%
Fish flavoring: 0.5%
Proteins isolated from soya: 15%

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A foodstuff having a protein efficiency coefficient of about that of milk casein, comprising a texturized proteins selected from the group consisting of vegetable proteins, animal proteins, and mixtures thereof, impregnated with an amount of a binder material sufficient to bind said texturized protein together and to improve the nutritive properties and protein balance of said texturized protein in order to provide an amino acid balanced foodstuff, said binder material comprising (i) from 10 to 20% by dry weight of unmodified, undenatured gluten, (ii) from 10 to 20% by dry weight of dairy seroproteins, (iii) from 1 to 5% by dry weight of albumin, and (iv) an edible liquid diluent in an amount sufficient to provide 100% by weight of said binder.

2. The foodstuff as defined by claim 1, comprising from 13 to 17% by weight of the gluten, from 13 to 17% by weight of the dairy seroproteins, and from 1.5 to 3% by weight of the albumin.

3. The foodstuff as defined by claim 1, wherein said texturized protein is a spun protein selected from the group consisting of a spun animal protein and a spun vegetable protein.

4. The foodstuff as defined by claim 3, wherein said spun protein is selected from the group consisting of soya protein, sunflower protein, horsebean protein and milk casein.

5. The foodstuff as defined by claim 3, wherein the gluten is wheat gluten.

6. The foodstuff as defined by claim 3, wherein the albumin is ovalbumin.

7. The foodstuff as defined by claim 3, wherein the edible liquid diluent is water.

8. The foodstuff as defined by claim 3, comprising a bonded bundle of protein fibers.

9. The foodstuff as defined by claim 8, the bundle of protein fibers having a pH in the range of from 4.5 to 6.5.

10. The foodstuff as defined by claim 9, the bundle of protein fibers having a pH of about 5.5.

11. The foodstuff as defined by claim 8, the protein fibers having a water content of between about 50% and 80% by weight.

12. The foodstuff as defined by claim 11, the protein fibers having a water content of between about 60% and 70% by weight.

13. The foodstuff as defined by claim 8, wherein the weight ratio of spun protein to binder ranges from about 4/1 to 1/2.

14. The foodstuff as defined by claim 13, wherein the weight ratio is about 1/1.

15. The foodstuff as defined by claim 8, wherein the protein fibers contain a plurality of fat particles.

16. The foodstuff as defined by claim 15, the protein fibers containing from about 0.5 to 40% by weight of fat particles.

17. The foodstuff as defined by claim 16, the protein fibers containing from about 5 to 30% by weight of fat particles.

18. The foodstuff as defined by claim 8, further comprising at least one member selected from the group consisting of a flavor, a spice, a colorant, a preservative, an emulsifier, and a fat.

19. A meat substitute comprising a foodstuff as defined by claim 8.

20. The meat substitute as defined by claim 19, the said protein being soya protein.

21. A process for the preparation of the foodstuff as defined by claim 8, comprising mixing the spun protein and the binder composition for a period of from 15 minutes to 1 hour, and then heating the mixture at a temperature of between 50° and 120° C. to effect coagulation of said composition, said coagulation being effected either by spreading the mixture on a heated horizontal support or by spreading the mixture on a horizontal support and conveying the support through an oven.

22. The process as defined by claim 8, comprising mixing the spun protein and the binder composition for a period varying from 30 minutes to 40 minutes and thereafter cooking the mixture for a period of 15 minutes to 1 hour at a temperature of between 80° and 100° C. to effect coagulation of said composition, said cooking being effected either by spreading the mixture on a heated horizontal support or by spreading the mixture on a horizontal support and conveying the support through an oven.

23. A process for the preparation of the foodstuff as defined by claim 8, comprising continuously impregnating the protein fibers with the binder composition and then coagulating the thus impregnated fibers.

24. The process as defined by claim 23, wherein the impregnation is effected by passing the protein fibers through a bath comprising the binder.

25. The process as defined by claim 23, wherein the impregnation is effected by spraying the protein fibers with the binder.

26. The foodstuff as defined by claim 1, wherein the edible liquid diluent is selected from the group consisting of milk and water.

27. The foodstuff as defined by claim 26, wherein the edible liquid diluent is water.

28. The foodstuff as defined by claim 1, further comprising at least one member selected from the group consisting of a flavor, a spice, a colorant, a preservative, an emulsifier, and a fat.

* * * * *